(12) United States Patent
Dubal et al.

(10) Patent No.: US 7,308,600 B2
(45) Date of Patent: Dec. 11, 2007

(54) MANAGING ACCESS TO SPARE DATA STORAGE DEVICES

(75) Inventors: Kamlesh I. Dubal, Cary, NC (US); Hin Cheuk Lam, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 10/916,284

(22) Filed: Aug. 11, 2004

(65) Prior Publication Data

US 2006/0036903 A1    Feb. 16, 2006

(51) Int. Cl.
*G06F 11/00*    (2006.01)
(52) U.S. Cl. .......................................................... 714/6
(58) Field of Classification Search ...................... None
See application file for complete search history.

(56) References Cited

U.S. PATENT DOCUMENTS

| | | | |
|---|---|---|---|
| 5,371,882 A * | 12/1994 | Ludlam | 714/7 |
| 5,566,316 A * | 10/1996 | Fechner et al. | 711/114 |
| 5,633,999 A | 5/1997 | Clowes et al. | |
| 5,796,934 A | 8/1998 | Bhanot et al. | |
| 5,812,751 A | 9/1998 | Ekrot et al. | |
| 5,941,994 A * | 8/1999 | DeKoning et al. | 714/7 |
| 6,496,942 B1 | 12/2002 | Schoenthal et al. | |
| 6,598,174 B1 | 7/2003 | Parks et al. | |
| 6,609,213 B1 | 8/2003 | Nguyen et al. | |
| 2004/0088508 A1* | 5/2004 | Ballard et al. | 711/162 |
| 2005/0155029 A1* | 7/2005 | Nguyen et al. | 717/168 |
| 2005/0198435 A1* | 9/2005 | Lee et al. | 711/114 |
| 2006/0015771 A1* | 1/2006 | Van Gundy et al. | 714/7 |

\* cited by examiner

*Primary Examiner*—Hiep T. Nguyen
(74) *Attorney, Agent, or Firm*—Quarles & Brady LLP

(57) ABSTRACT

A dynamic storage system allows storage servers to access spare data storage devices should an associated data storage device fail or become inaccessible. A sparing server receives requests for spare data storage devices from storage servers and allocates spare data storage devices, establishing and maintaining a communication channel between the storage server and the spare data storage device. Once the associated data storage device is returned to service, the spare data storage device is released by the storage server and returned to a spare storage pool by the sparing server.

16 Claims, 3 Drawing Sheets

MANAGING ACCESS TO SPARE DATA STORAGE DEVICES

BACKGROUND OF THE INVENTION

1. Field of the Invention

This invention is related in general to data storage systems. In particular, the invention consists of a system for providing and accessing spare data storage devices.

2. Description of the Prior Art

Computer data storage systems typically include servers, switches, and high-capacity disk arrays for storing digital information. Maintaining the integrity of data stored within the computer data storage system is a major concern. This concern has resulted in the development of numerous methods and techniques for maintaining data integrity during movement and storage within the computer data storage systems.

One important technique is the utilization of dynamic drive sparing ("DDS"), wherein a data storage server can access one or more spare data storage devices to replace a data storage device that has failed or has been taken off line for maintenance. To be effective, this sparing process should not significantly impact data storage system performance or data integrity. However, permanent data loss may occur if the demand for spare data storage devices exceeds the available number of such devices.

In U.S. Pat. No. 6,609,213, Nam Nguyen et al. disclose a system and method for recovering from a server failure in a computer network using several stand-alone, non-clustered serves and a spare server. However, the spare server is used as a backup for the network servers and does not provide backup services in the event an independent storage device fails. Accordingly, it would be desirable to have a server that manages access to spare storage devices.

In U.S. Pat. No. 6,598,174, Ronald Parks et al. disclose a method to detect early disk failure warning and ways to migrate data to other drives in a non-redundant array environment. However, Park's disclosed invention requires equipment for detecting an impending failure and copying data before the original drive fails. It would be advantageous to have a system for providing a spare drive when a drive fails or is removed without warning.

SUMMARY OF THE INVENTION

The invention disclosed herein utilizes a disk management device, such as a disk server, to manage a pool of spare storage devices. The basic idea is that an extra storage server, namely a sparing server, is set up for sparing purposes only. The sparing server is not intended as a backup for other storage servers, but rather is used to manage communications channels between storage servers and spare storage devices. The spare storage devices are grouped within a spare storage pool.

The sparing server may be shared by numerous storage servers. When a storage server runs out of spare storage devices, it can request a spare drive from the sparing server. Preferably, subsequent data transfer and communication between the spare storage device and the storage server will travel through a high-speed communication channel, such as fiber optic cable. An advantage is that effective storage capacity is not sacrificed when a storage device fails and users don't need to worry about a particular storage server exceeding its own spare storage devices. Because multiple storage servers have access to the sparing sever, costs are reduced by eliminating the need for each storage server to maintain its own set of spare storage devices.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of utilizing a sparing server to manage communication channels between storage servers and a set of spare data storage devices. The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
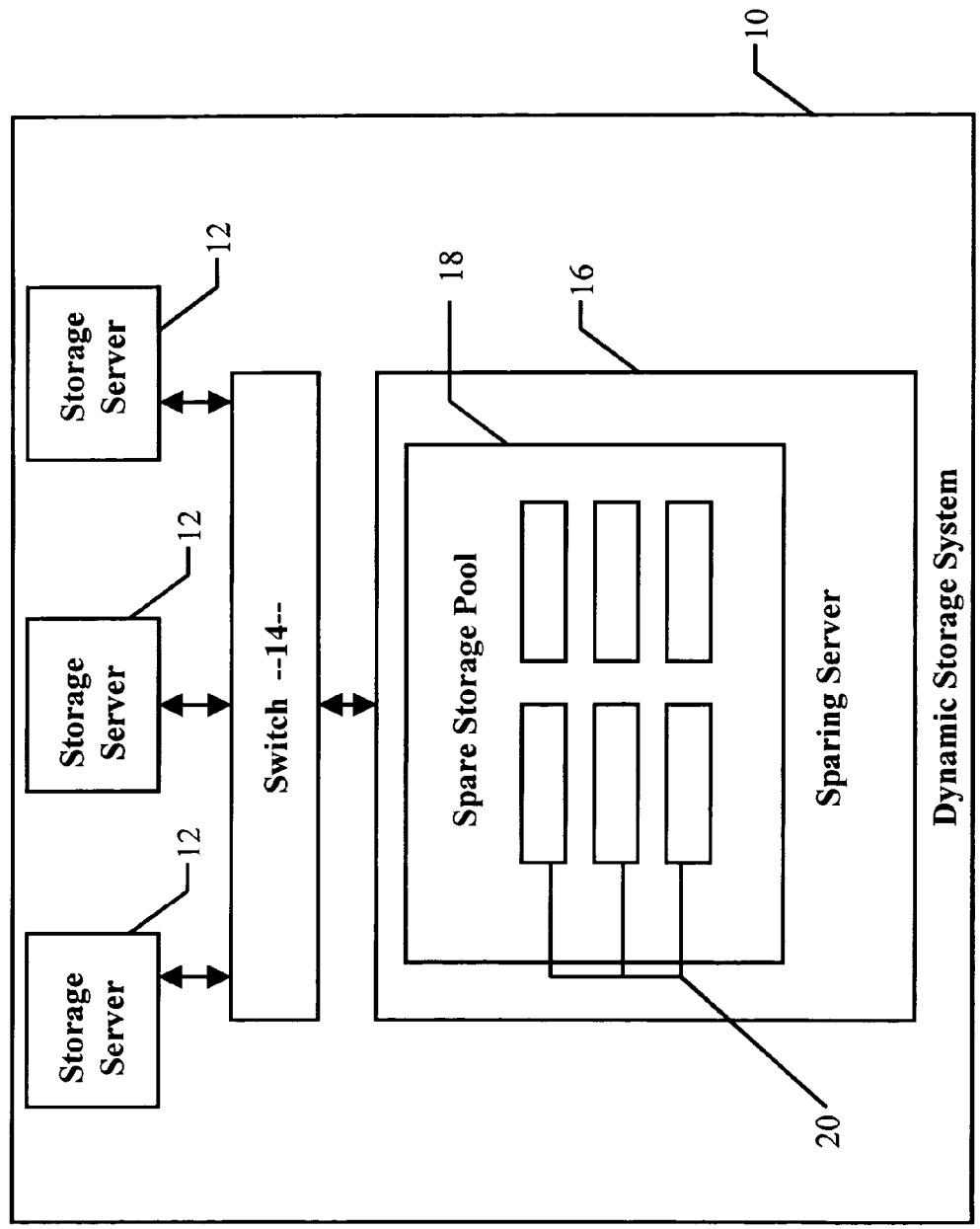
FIG. 1 is a block diagram illustrating a plurality of storage servers, a sparing server, and a spare storage pool.

Referring to figures, wherein like parts are designated with the same reference numerals and symbols, FIG. 1 is a block diagram of a dynamic storage system ("DSS") 10 including one or more storage servers 12, a switch 14, a sparing server 16, and a spare storage pool 18 containing a group of spare data storage devices 20. The storage servers 12 are devices that include one or more data storage device for storing information, such as a tape drive, hard-disk drive, or magneto-optical drive. Information stored on the data storage devices may be analog or digital. In one embodiment of the invention, the storage server is a computing device for reading and writing digital information to and from hard disk drives.

The switch 14 can be any device for directing the flow of information between the storage servers 12 and the sparing server. The switch 14 may be a network switch, bridge, token ring, or other similar communication device and may utilize point-to-point networking or address-based message delivery. The sparing server 16 is responsible for establishing and managing a communication channel between one or more storage servers 12 and spare storage devices 20. In one embodiment of the invention, the sparing server is a computing device used to direct the flow of information between the computing devices of the storage servers 12 and hard-disk drives.

A typical storage server 12 may includes one or more data storage device. In a typical storage system, the storage server may include additional data storage devices that may be accessed in case a standard data storage device fails. However, if more data storage devices fail than are available within the storage server, permanent data loss may occur. Additionally, if each storage server 12 includes its own set of spare data storage devices, the cost of the storage servers would correspondingly increase. Therefore, spare data storage devices 20 are best placed in the spare storage pool 18, for access by all the storage servers 12 within the dynamic storage system 10.

Figure 2:
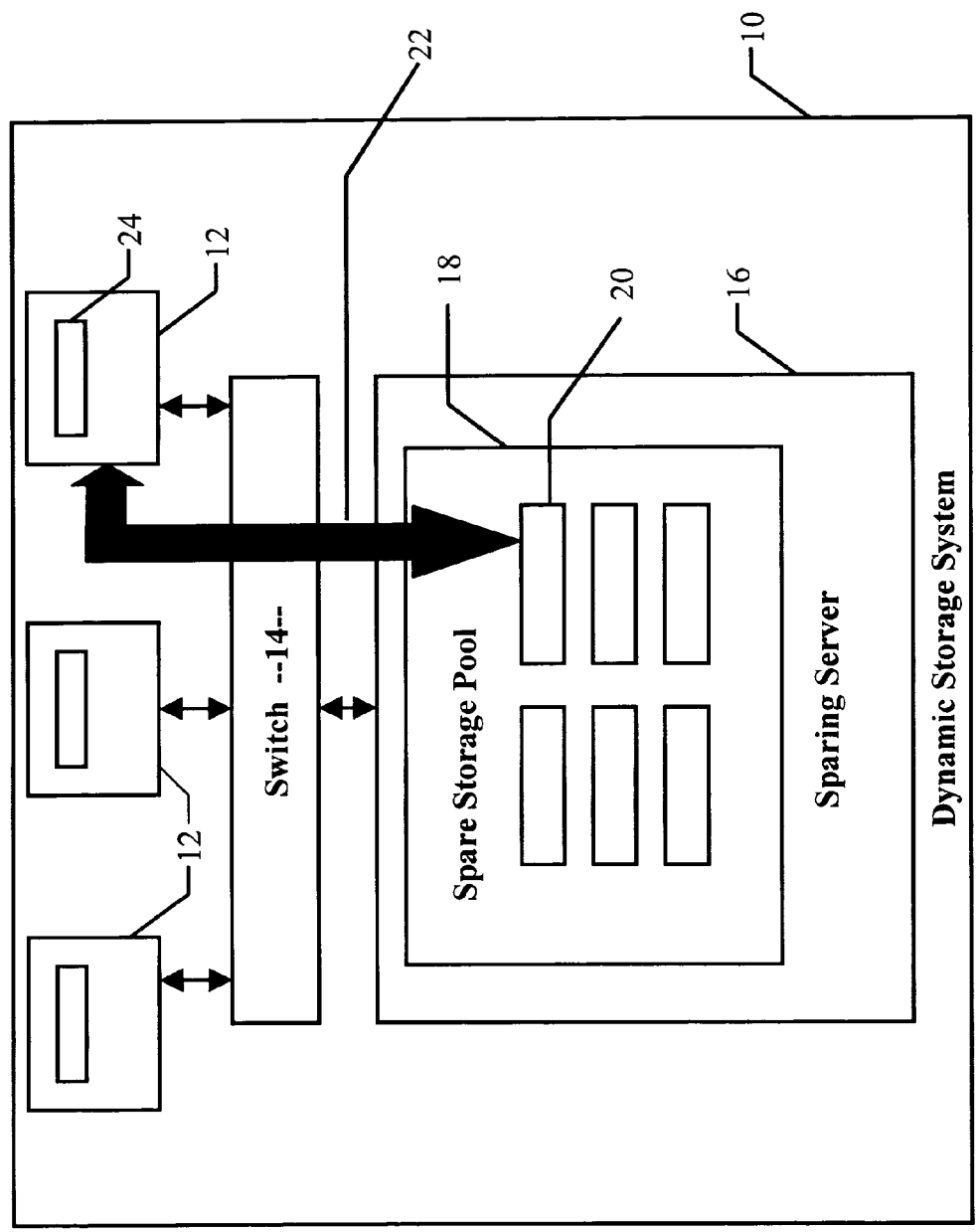
FIG. 2 is a block diagram illustrating a communication channel established between a storage server and a spare data storage device from the spare storage pool of FIG. 1.

The block diagram of FIG. 2 illustrates the establishment of a communication channel 22 between a storage server 12 and a spare data storage device 20. An important aspect of the invention is that the sparing server 16 establishes and manages the communication channel 22. When the storage server 12*a* has a failure of a data storage device 24, it transmits a request to the sparing server 16. The sparing server 16 reserves a particular spare data storage device 20*a* for exclusive use by the requesting storage server 12*a*. The storage server 12*a* is notified of the allocated spare data storage device 20*a* and the sparing server establishes the communication channel 22. A fiber optic cable is one effective medium for the communication channel 22. Additionally, the switch 14 may be a fiber-optic switch used to accommodate fiber optic communication channels. Once the communication channel 22 has been established, the spare data storage device 20*a* is used by the storage server 12*a* as if it was a data storage device within the storage server 12*a*. Multiple communication channels 22 may be used to provide redundancy in case of failure of an individual communication channel 22.

Figure 3:
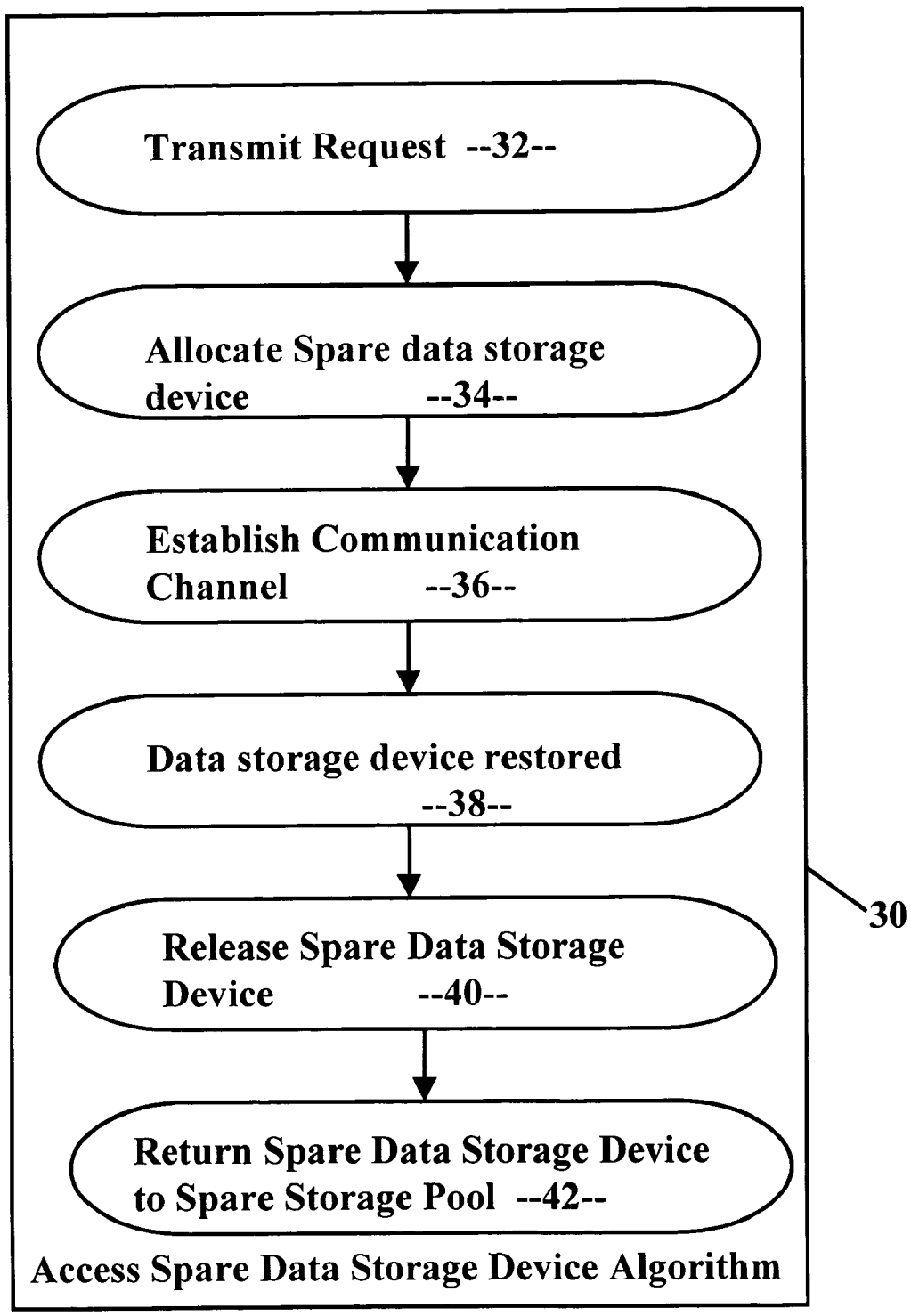
FIG. 3 is a flow-chart illustrating the process of establishing a communication channel between a storage server and a spare data storage device.

FIG. 3 illustrates the access spare data storage device algorithm 30. In step 32, the storage server 12 recognizes that one of its data storage devices has failed and transmits a request to the sparing server 16. In step 34, the sparing server 16 allocates a spare data storage device. In step 36, the sparing server establishes a communication channel 22 between the spare data storage device and the storage server 12. In step 38, normal server activity resumes within the storage server 12. Once the data storage device within the storage server 12 has been repaired or replaced, the spare data storage device 20 is released by the storage server 12 in step 40. In step 42, the sparing server 16 returns the release spare data storage device to the spare storage pool.

Those skilled in the art of making data storage systems may develop other embodiments of the present invention. For example, a traditional network connection may be utilized as the communication channel between the storage servers 12 and the spare data storage devices 20. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A dynamic storage system, comprising:
    a first storage server adapted to transmit a request in response to a first data storage device becoming inaccessible;
    a spare storage pool containing a spare data storage device; and
    a second storage server, configured as a sparing server, adapted to establish and maintain a plurality of communication channels over a plurality of network connections between the spare data storage device and the first storage server in response to said request, the plurality of communication channels providing redundancy in the event of a failure of an individual communication channel.

2. The dynamic storage system of claim 1, wherein the spare data storage device is a hard-disk drive.

3. The dynamic storage system of claim 1, wherein the spare data storage device is a magnetic tape drive.

4. The dynamic storage system of claim 1, wherein the spare data storage device is a magneto-optical drive.

5. The dynamic storage system of claim 1, wherein the storage server is a computing device.

6. The dynamic storage system of claim 1, wherein the sparing server includes a disk controller.

7. The dynamic storage system of claim 1, further including a switch for directing the flow of information between the first storage server and the sparing server.

8. The dynamic storage system of claim 7, wherein the switch includes a network switch, bridge, or token ring device.

9. A method of accessing a spare data storage device, comprising the steps of:
    configuring a first storage server as a sparing server;
    requesting the sparing server to provide a spare data storage device in response to a first data storage device becoming inaccessible;
    allocating the spare data storage device to a second storage server by the sparing server;
    notifying the second storage server of the allocated spare data storage device; and
    establishing a plurality of communications channels, between the spare data storage device and the second storage server, by the sparing server, wherein the plurality of communication channels provide redundancy in the event of a failure of an individual communication channel.

10. The method of claim 9, further comprising the step of releasing the spare data storage device.

11. The method of claim 10, further comprising the step of returning the spare data storage device to a spare storage pool.

12. The method of claim 10, wherein the individual communication channel is a fiber optic cable.

13. An article of manufacture including a data storage medium, said data storage medium including a set of machine-readable instructions that are executable by a processing device to implement an algorithm, said algorithm comprising the steps of:
    configuring a first storage server as a sparing server;
    requesting the sparing server to provide a spare data storage device in response to a first data storage device becoming inaccessible;
    allocating the spare data storage device to a second storage server by the sparing server;
    notifying the second storage server of the allocated spare data storage device; and
    establishing a plurality of communications channels, between the spare data storage device and the second storage server, by the sparing server, wherein the plurality of communication channels provide redundancy in the event of a failure of an individual communication channel.

14. The article of manufacture of claim 13, further comprising the step of releasing the spare data storage device.

15. The article of manufacture of claim 14, further comprising the step of returning the spare data storage device to a spare storage pool.

16. The article of manufacture of claim 15, wherein the individual communication channel is a fiber optic cable.

* * * * *